Nov. 22, 1927.

W. R. MITTENDORF

CALCULATING SCALE

Filed May 16, 1925    5 Sheets-Sheet 1

1,650,227

INVENTOR.
W. R. MITTENDORF

ATTORNEY.

Nov. 22, 1927.

W. R. MITTENDORF 1,650,227

CALCULATING SCALE

Filed May 16, 1925   5 Sheets-Sheet 2

INVENTOR.
W. R. MITTENDORF

ATTORNEY.

Nov. 22, 1927.  
W. R. MITTENDORF  
1,650,227  
CALCULATING SCALE  
Filed May 16, 1925   5 Sheets-Sheet 3

INVENTOR.  
W. R. MITTENDORF  
ATTORNEY.

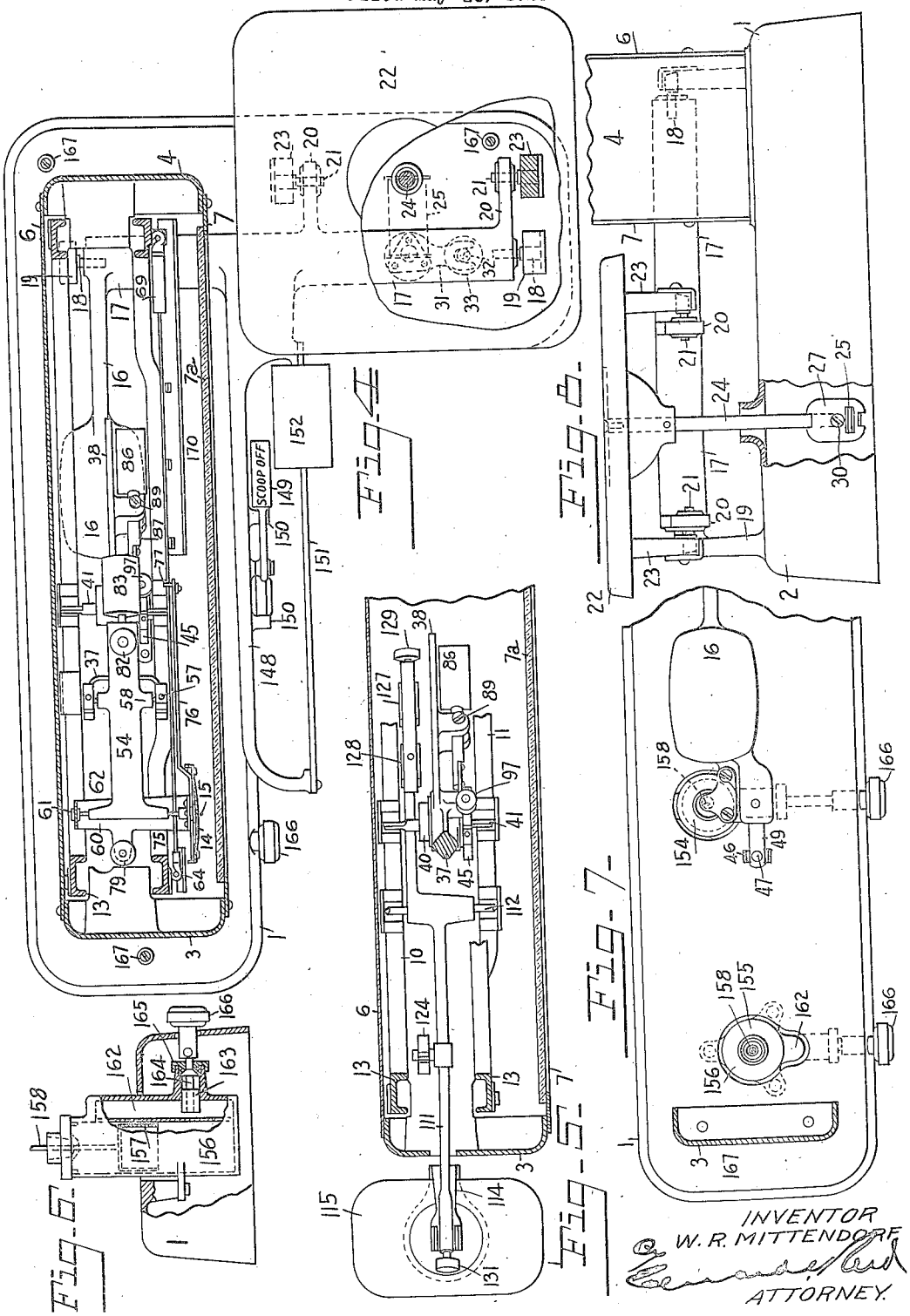

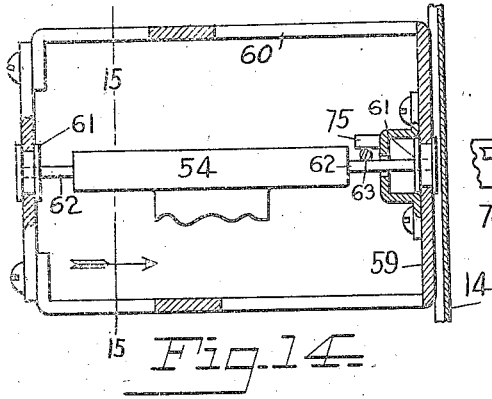
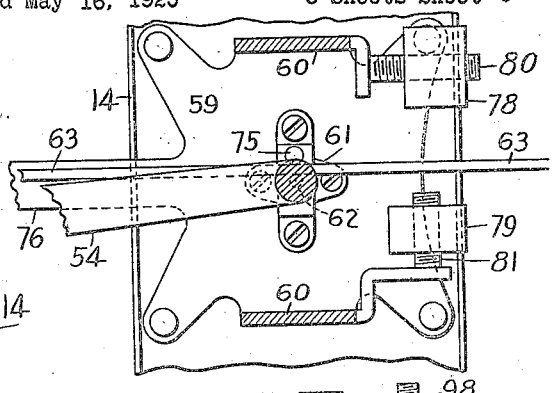
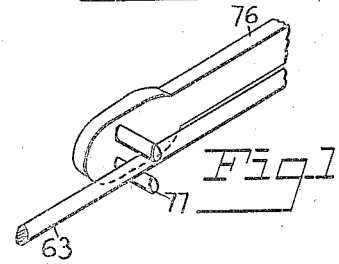
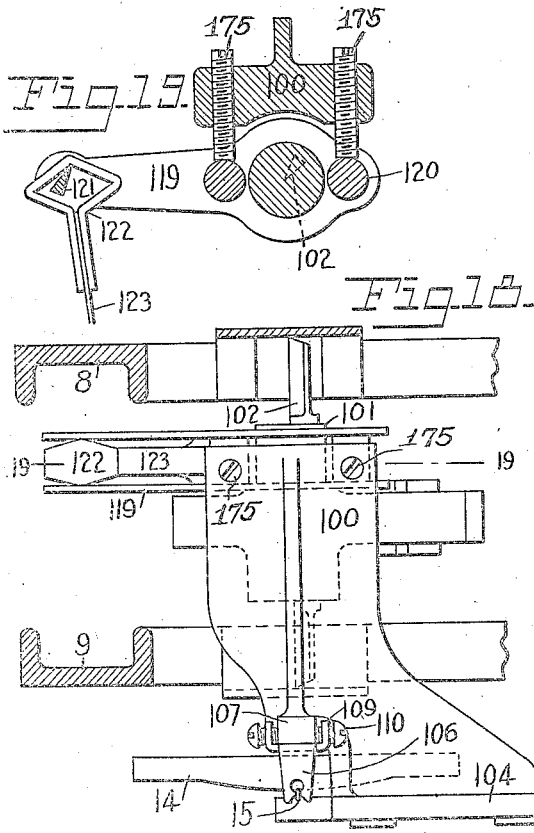
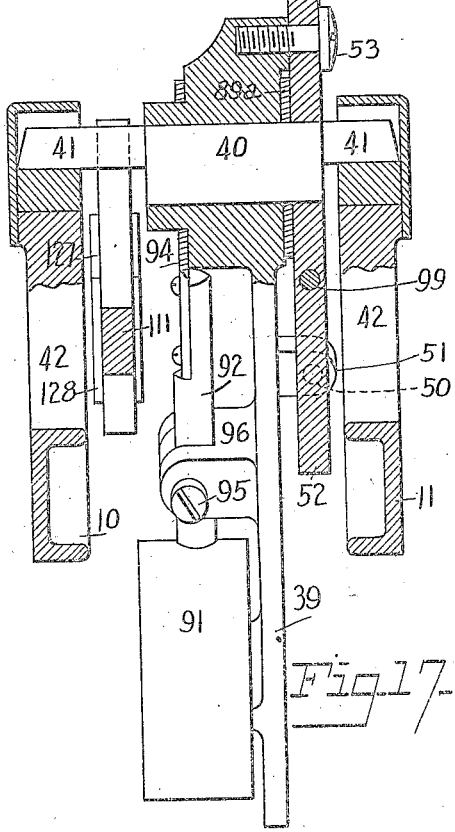

Patented Nov. 22, 1927.

1,650,227

UNITED STATES PATENT OFFICE.

WILLIAM R. MITTENDORF, OF CINCINNATI, OHIO, ASSIGNOR TO THE WATSON EXPERI-
MENTAL LABORATORY COMPANY, OF DAYTON, OHIO, A CORPORATION OF OHIO.

CALCULATING SCALE.

Application filed May 16, 1925. Serial No. 30,675.

This invention relates to calculating scales and one object of the invention is to provide such a scale which may be used for determining the number of articles in a mass of articles of like weight, or for counting out a predetermined number of articles of like weight, or for computing the money value of a commodity as determined by the price per pound or other unit of computation.

A further object of the invention is to provide such a scale which will be automatic in its operation and which will require no computation or manipulation on the part of the operator other than the placing of the unit or the setting of the unit value indicator.

A further object of the invention is to provide such a scale which will count articles of any odd unit of weight within its capacity and will compute the money value of a commodity at any odd price per unit of weight within its capacity without in any manner changing the mechanical multiplication of leverage which exists in the scale.

A further object of the invention is to provide such a scale in which the result of the computation, whether a counting operation or a money value computing operation, will be indicated on a single series of graduations.

A further object of the invention is to provide such a scale which will indicate the result of the computation and the weight of the mass simultaneously and will also indicate the weight of the unit or indicate the price per pound simultaneously with the indication of the result of the computation.

A further object of the invention is to provide a scale of this character which will be simple in its construction and operation, accurate in operation and of such a character that the parts thereof will not be easily disarranged or so affected as to interfere with the proper operation thereof.

Other objects of the invention will appear as the mechanism is described in detail.

Figure 1:
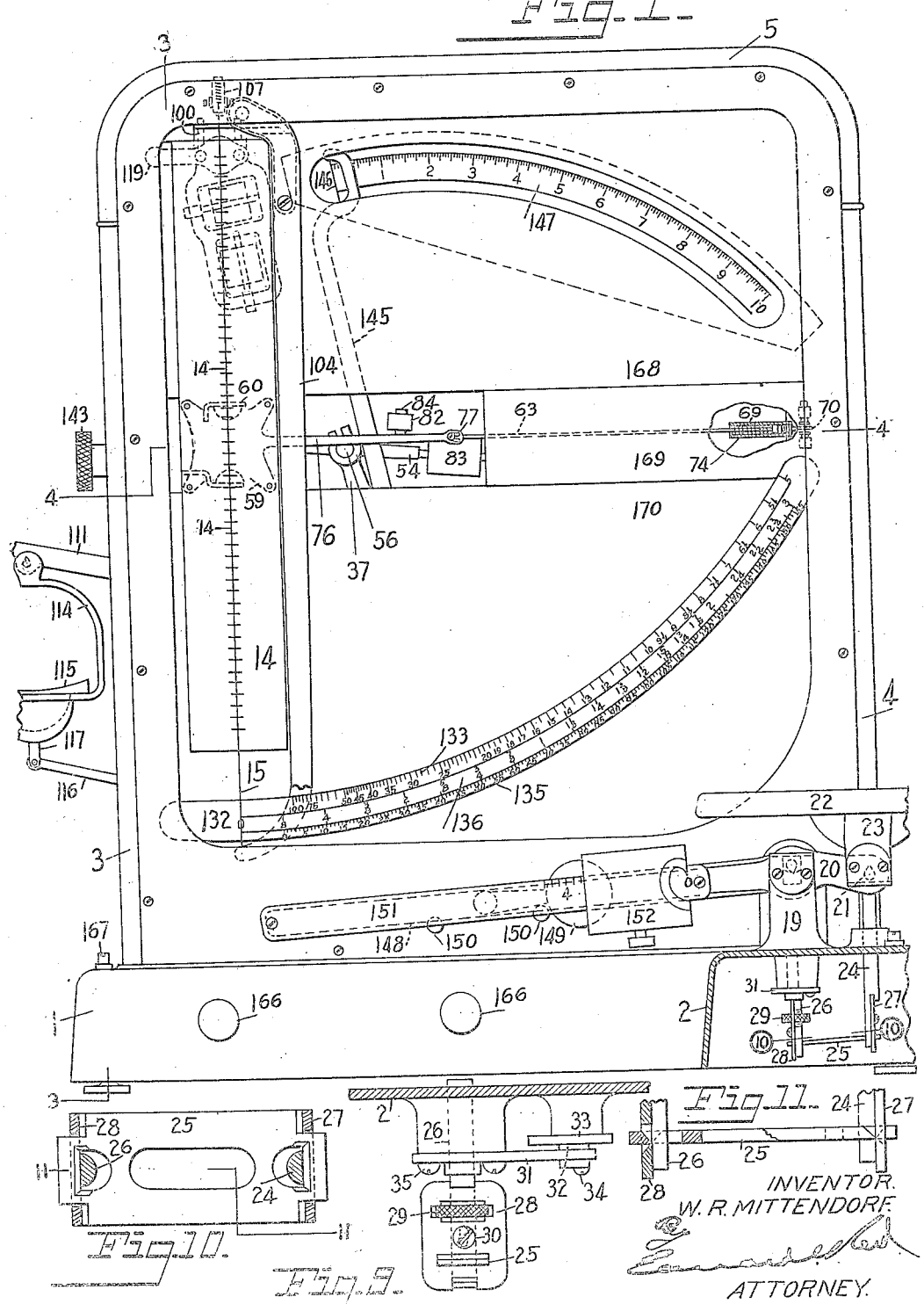
Figure 2:
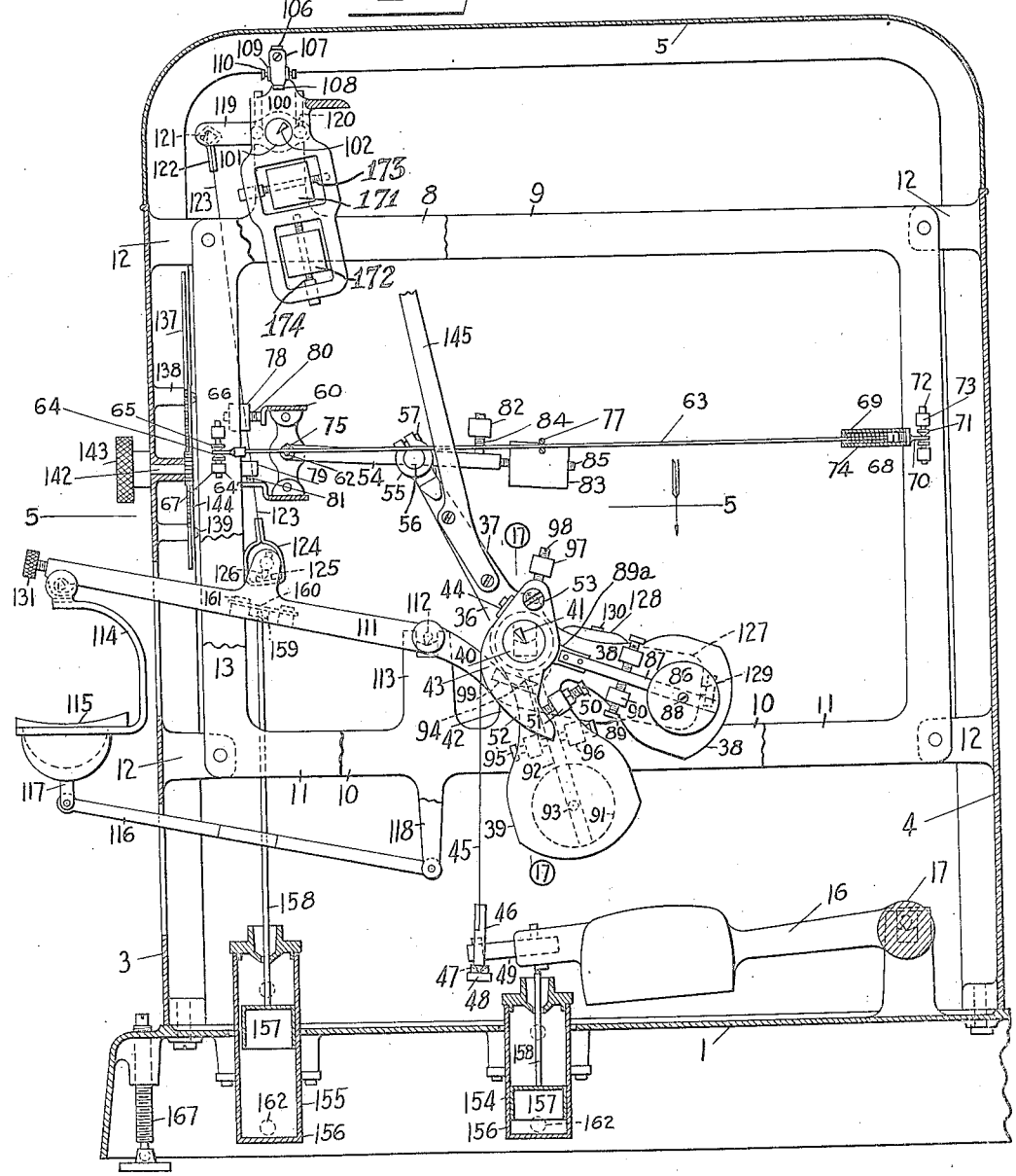
Figures 3, 12, 13, 20:
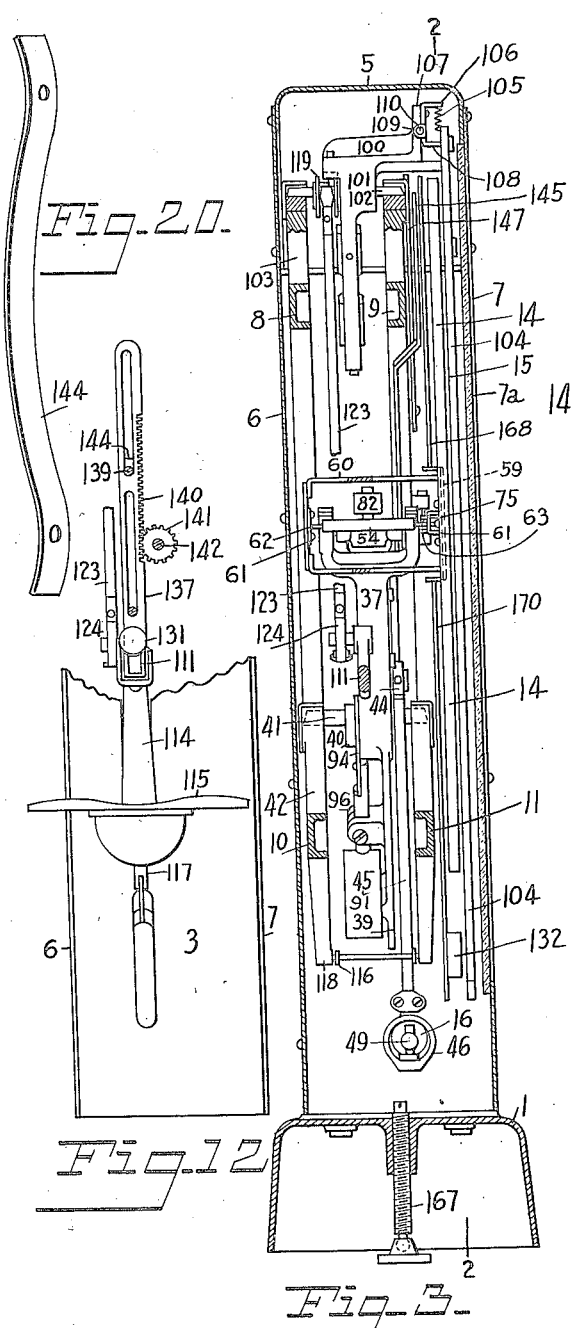

In the accompanying drawings Fig. 1 is a front elevation of a scale embodying my invention, partly broken away; Fig. 2 is a vertical section taken transversely of the mechanism on the line 2—2 of Fig. 3; Fig. 3 is a sectional view taken on the line 3—3 of Fig. 1; Fig. 4 is a horizontal section taken on the line 4—4 of Fig. 1, showing the lower portions of the mechanism in plan; Fig. 5 is a transverse section taken on the line 5—5 of Fig. 2; Fig. 6 is a detail view, partly broken away, of one of the dash pots; Fig. 7 is a sectional view taken through the casing and showing the dash pots in plan view; Fig. 8 is an end elevation, partly broken away, showing the load balance; Fig. 9 is a detail elevation of one of the supporting posts with the check link mechanism; Fig. 10 is a section taken on the line 10—10 of Fig. 1; Fig. 11 is a sectional view taken on the line 11—11 of Fig. 10; Fig. 12 is a detail view of the manually operated adjusting mechanism for the indicator wire; Fig. 13 is a facsimile, partly broken away, of the chart; Fig. 14 is a section taken on the line 14—14 of Fig. 1; Fig. 15 is a sectional view taken through the check link mechanism on the line 15—15 of Fig. 14; Fig. 16 is a perspective view of the means for holding the indicator in a vertical position; Fig. 17 is a section on the line 17—17 of Fig. 2; Fig. 18 is a plan view of the pivot and support for the indicating arm; Fig. 19 is a section on the line 19—19 of Fig. 18; and Fig. 20 is a detail view of the leaf spring on the manually operated adjusting device.

The calculating scale of the present invention comprises two separately mounted indicating members which are independently movable into intersecting relation, one of the members having a series of graduations which will be intersected by the other member, the particular graduation which is intersected by said other indicating member indicating the result of the computation. Both of the indicating members may be controlled by weighing mechanisms, such as a load balance and a unit balance separately connected with the respective indicating members, or one of the indicating members may be controlled by weighing mechanism, such as a load balance, and the other may be manually adjusted. In either instance each indicating member and its associated operating devices are wholly independent of the other indicating member and its operating devices. In the scale here illustrated one indicating member is always operated by the load balance and the other indicating member is operatively connected with a unit balance and may be actuated by said unit balance to compute the number of parts in a mass of parts of like weight, or it may be manually adjustable for otherwise effecting the computation, such as computing the number of parts in a mass of like parts according to an index number, or other arbitrary designation, or the computing of the value of the load on the load balance according to a given price per pound. That particular embodiment of the invention here illustrated has been chosen for the purpose of illustration only and it will be understood that the several parts of the scale may take various forms and may be associated one with the other in various manners without departing from the spirit of the invention.

In that particular embodiment of the invention here illustrated the scale comprises a base 1 having at one side thereof a forwardly extending portion 2. Mounted on this base and enclosing the major portion of the mechanism is a casing consisting of upright side members 3 and 4, a top member 5 and front and rear walls 6 and 7. The front wall is provided with a relatively large opening which is closed by a pane of glass 7ª or other transparent material. The side members 3 and 4 of the casing also constitute frame members and have mounted thereon front and rear frames which extend transversely to the casing. These frames consist of upper transverse members 8 and 9 and lower transverse members 10 and 11, which are secured to lugs 12 carried by the respective side members 3 and 4. The frames also comprise upright members 13 extending between the end portions of the respective transverse members and also secured to the lugs 12. The transverse and vertical members of the front and rear frames, respectively, are here shown as formed integral.

In this form of the scale one of the indicating members is in the form of an elongated chart 14 mounted for bodily movement in a straight line transverse to its length and having a longitudinally extending series of graduations, and the other indicating member is in the form of a wire, or other thin member, 15 which is pivotally supported at one end for movement into a position in which it will intersect the series of graduations on the chart. The chart is provided with a plurality of columns of numerals arranged parallel with the series of graduations and the corresponding numerals of the several columns are associated with the same graduation on the chart and are significant of the value of this graduation according to different units of computation. The present chart has six columns of numerals and these columns are numbered 1, 2, 5, 10, 25 and 50, respectively, these numbers representing the number of parts in the unit. When a counting operation is effected with a unit consisting of one part the numerals in the column No. 1 represent the value of the graduations. When the count is effected with a unit consisting of two parts then the numerals in the column No. 2 represent the value of the respective graduations; and so on. The pivoted indicating member which is herein designated as a wire may consist of a thin metallic wire or it may consist of a strand of fibrous material or of any other suitable character and it will be understood that the term "wire" as herein employed is intended to include an indicating member of this character regardless of the material of which it is formed.

In the present apparatus the chart is actuated by load controlled mechanism so that its position will correspond to the weight of the load. Preferably a load balance is operatively connected with the chart, through suitable supporting mechanism. The load balance is shown as comprising a main lever 16 pivotally supported on the base 1. This lever is rigidly secured at its outer or right hand end to a transverse portion or hub 17 which extends forwardly beyond the front wall 6 of the casing and is provided at its ends with knife edge pivots 18 which are supported in bearings carried by lugs 19 which extend upwardly from the base 1 and the extension 2 thereof. Extending outwardly from this hub portion of the lever are two arms 20 and mounted in these arms are knife edge pivots 21 on which a load receptacle or platform 22 is supported by means of bearings carried by lugs 23 depending therefrom. The load receptacle is maintained in its proper position with relation to the lever by means of a post 24 extending downwardly therefrom into the extension 2 of the base and connected by means of a link 25 with a second post 26 rigidly secured to the extension 2 of the base and arranged substantially parallel with the post 24. The link preferably has knife edge pivotal connection with the two posts and to this end the post 14 has rigidly secured thereto a plate 27 and the post 26 has rigidly but adjustably secured thereto a plate 28, the plate and link having cooperating contact surfaces. The plate 28 is adjustable lengthwise of the post 26 to facilitate the sealing of the right and left hand sides of the platform. This adjustment is effected by means of a nut 29 screw threaded onto the post and extending through an opening in the plate so that the vertical adjustment of the nut on the post will likewise impart vertical adjustment to the plate. The plate is secured in its adjusted position by means of a screw 30 extending through a slot in the same and threaded into the post. It is also desirable that the rod or post 26 be adjustable radially so as to secure absolute parallelism between the plates 27 and 28. To accomplish this I have rigidly secured to the post 26 an arm 31, the position of which is controlled by an eccentric stud 32 mounted in the extension of the base and extending through the end portion of the arm 31. A milled collar 33 is secured to the eccentric stud to facilitate the rotation thereof. After the adjustment of the rod has been effected by means of the arm 31 the stud or button 32 is secured in position by means of a screw 34 and the rod is further secured to the base by means of screws 35.

The chart 14 is carried by a supporting structure 36 which is operatively connected with the inner or long arm of the lever 16 of the load balance. This supporting structure is here shown as comprising an upwardly extending arm 37 and two diverging arms 38 and 39 extending laterally and downwardly therefrom. The supporting structure further comprises a hub portion 40 which may if desired, be formed integral with the three arms and is provided with knife edge pivots 41 which engage bearings carried by brackets 42 extending upwardly from the transverse frame members 10 and 11. Rigidly but adjustably connected with the hub of the supporting structure is a cam 43 and secured to this cam, by means of a clip 44, is a tape or metallic ribbon 45 which extends about the cam surface thereof and has secured to its lower end a stirrup 46 which is provided with a needle socket 47 to receive a needle point 48 carried by the nose iron 49 of the lever 16. The cam 43 is adjustable about the axis of the supporting structure by means of a screw 50 threaded through a lug 51 carried by the arm 39 and engaging a projection or toe 52 on the cam. The cam is locked in adjusted positions by means of a screw 53 extending through a slot therein and threaded into a part of the supporting structure.

The supporting structure also serves to carry a pendulum counterbalance for the lever 16 of the load balance and in the construction here shown this counterbalance comprises a weight 86 adjustably mounted on a rod 87 which is connected with the supporting structure. The weight 86 is preferably capable both of angular adjustment with relation to the supporting structure and of radial adjustment with relation thereto. The radial adjustment is secured by mounting the weight on the rod 87 for adjustment lengthwise thereof and providing means, such as a screw 88, for securing it in its adjusted positions on the rod. The angular adjustment is secured by connecting the rod with the supporting structure by means of a plate 89 which is preferably arranged concentric with the axis of the supporting structure and is adjustable about that axis. This angular adjustment or the movement of the weight about the axis of the supporting structure is accomplished by means of screws 89 threaded in lugs 90 carried by the arm 38 of the supporting structure, the screws being arranged on opposite sides of the rod 87 and serving to adjust the same and to retain the same in adjusted position.

Pivotally mounted on the upper end of the arm 37 of the supporting structure is a chart supporting member or lever 54. This lever may be mounted on the arm 37 in any desired manner and, in the present device, the upper portion of that arm is forked, as shown in Fig. 3, and each fork is provided with an annular end portion 55 to receive a bearing 56 and is split so that the bearing can be clamped in position within the opening by means of a screw 57. These bearings are adapted to receive the ends of a shaft 58 carried by the lever 54 and projecting beyond the respective sides thereof. The chart is pivotally mounted on the lever 54 and may be secured thereto in any suitable manner but preferably a plate 59 is rigidly secured to the rear side of the chart and carries a bracket 60 having at its front and rear ends bearings 61 to receive the ends of a shaft 62 which is carried by and projects beyond the lateral edges of the end portion of the lever 54. By means of this construction the movement of the supporting structure about its axis will impart lengthwise movement to the supporting lever 54 and to the chart. In order that the computations may be accurately effected it is essential that the chart should be held at a fixed height and, further, that it should be retained in a true vertical position. To accomplish these results I have provided a transverse guide 63 extending along the path of movement of the chart and which is here shown as a rod or wire 63 having at its left hand end a hook 64, the inner edge of which has a knife edge and is adapted to enter a V-groove in a collar 65 carried by a screw 66 mounted in lugs 67 on the upright frame member 13 at the left hand side of the casing. In order that this guide wire may be retained taut and perfectly straight at all times I have interposed a spring between the same and its point of connection with the right hand side of the frame. To this end the wire is provided with a head 68 which is slidably mounted in a tubular shell 69 which is connected by means of a hook 70 with a collar 71, having a V-shaped groove and carried by a screw 72 mounted in lugs 73 on the upright frame member 13 at the right hand side of the casing. A spring 74 is coiled about the wire 63 within the shell 69 and between the head 68 of the wire and the inner end of the shell and thus serves to exert a constant pull upon the guide wire and hold the same under tension. Connected with the chart are suitable parts which cooperate with this guide wire to retain the chart in its proper position. The guide wire is so arranged that it lies just above the shaft 62 by means of which the chart is supported on the lever 54. Arranged just above the guide wire is a rearwardly extending stud 75 which is carried by the bracket 60 and is spaced from the shaft 62 a distance slightly greater than the thickness of the guide wire so that when the chart is supported at its proper height both the shaft and the stud will be out of contact with the guide wire but any tendency of the chart to move upward or downward will cause one or the other of these members to contact with the guide wire before any appreciable movement has been imparted to the chart. Connected with the chart and preferably secured to the plate 59 is an arm 76 which extends lengthwise of the guide wire 63 for a considerable distance beyond the edge of the chart and is provided with transversely extending fingers 77 arranged above and below the guide wire 63 and spaced apart a distance slightly greater than the thickness of that wire so that when the chart is in a true vertical position both fingers will be out of engagement with the guide wire but any tendency on the part of the chart to move out of a vertical position will cause one or the other of the fingers to engage the guide wire and check the movement of the chart before it has departed appreciably from its vertical position.

Any frictional resistance offered to the movement of the chart or its controlling devices will adversely affect the accuracy of the computation and, in the present structure, I have practically eliminated friction from the controlling mechanism for the chart. This I have accomplished by establishing the center of gravity of the chart at its axis and by establishing the center of gravity of the chart supporting lever at its axis. By thus establishing the centers of gravity of these parts at their axes all pressure on the parts is removed and consequently the friction between the contacting portions of the controlling mechanism is eliminated. The centers of gravity of these parts may, of course, be established at their axes by the proper proportioning and shaping of the parts themselves but I prefer to provide adjustable means whereby this may be accomplished. In order to establish the center of gravity of the chart at its axis I have mounted on the bracket 60 weights 78 and 79 which are screw threaded onto pins 80 and 81 anchored on the bracket and which extend in intersecting lines. The supporting lever 54 is also provided with weights 82 and 83 screw threaded onto pins or projections 84 and 85 which are anchored in the lever on that side of its axis opposite the chart and which also extend in intersecting lines. By means of these balancing weights the center of gravity of the lever unit, which comprises the lever 54 and all the parts attached to it, including the chart itself, may be established at the axis of the lever. With the centers of gravity of these parts thus established at their axes it will be obvious that when one of the guide parts connected with the lever engages the guide wire 63 there will be no pressure on that part except that which is caused by the influence which tends to move the chart from its true position and as soon as this influence is removed the friction between the guide members will be entirely removed.

For convenience in sealing the scale it is desirable that the counterbalancing weight 86, rod 87 and plate 89, which may be termed the counterbalance unit, be made to serve as the sole counterbalance for the lever 16 of the load balance uninfluenced by any variable distribution of weight in the supporting structure and the parts carried thereby. For this purpose the center of gravity of the supporting structure and all parts attached thereto, including the chart supporting lever and chart but excluding the cam and the counterbalance unit, is established at the axis of the supporting structure. In the present device adjustable means are provided for so establishing the center of gravity of the supporting structure and this means comprises a weight 91 mounted on and adjustable lengthwise of a rod 92, a screw 93 being provided to hold the weight in adjusted positions on the rod. The rod 92 is connected with the supporting structure by means of a plate 94 mounted on the supporting structure concentric with the axis thereof and adjustable about said axis. The rod and the weight 91 are held in their angular adjusted positions by means of screws 95 threaded in lugs 96 on the arm 39 of the supporting structure and engaging the opposite sides of the rod 92. It is also desirable that the cam 43 have its center of gravity established at its axis so that the effect of its dead weight will be the same in any position to which it may be adjusted. For this purpose the cam is provided with a balance weight 97 threaded onto a screw 98 mounted in the cam and is further provided with a balance screw plug 99.

A second indicating member or wire 15 is pivotally mounted for movement about an axis coincident with the zero graduation on the chart and, in the present construction, it is carried by a supporting member 100, the hub portion 101 of which is provided with knife edge pivots 102 which engage bearings in brackets 103 extending upwardly from the front and rear frame members 9 and 8. Rigidly secured to this supporting member is an arm 104 which normally extends lengthwise of the chart but is offset in its relation thereto so that it will not lie in front of the chart. The lower end of this arm is curved so that when in its normal position it will extend beneath the center line of the chart and the lower end of the wire 15 is connected with this end of the arm. The upper end of the wire is connected with the supporting member 100 and in order that the wire may be held taut and straight at all times I prefer to interpose a spring between the wire and its point of connection with the supporting member. As here shown, a coiled spring 105 is connected at its lower end with the wire and is connected at its upper end with a forwardly extending lug 106 forming part of a bracket 107 which is pivotally mounted on the supporting member. The bracket has at its lower edge a second forwardly extending lug 108, the forward edge of which is notched and forms a seat for the wire and in which the wire is held by the action of the spring 105. It is essential that when the two indicating members are in their normal or idle positions the wire shall lie directly in front of the center line of the chart and intersect the knife edge of the pivot 102 and in order that the wire may be adjusted with relation to the chart and the pivot I have provided means for adjusting the bracket 17 with which the upper end of the wire is connected. As here shown, the bracket is provided with rearwardly extending lips 109 in which are mounted screws 110 arranged to engage the opposite sides of a part of the supporting member so that the adjustment of the screws will adjust the bracket with relation to the supporting member.

The wire may be moved about its axis in any suitable manner but, as has been above explained, the present mechanism is designed for operation either by a unit controlled device or manually, the manual operation being effected by the manual manipulation of the unit controlled device. To this end the supporting member 100 is operatively connected with a unit balance which comprises a main lever 111 having knife edge pivots 112 which are supported in bearings carried by brackets 113 extending upwardly from the transverse bars 10 and 11. The longer end of the lever 111 extends through and beyond the side wall of the casing and has pivotally supported on its outer end a holder 114 for a unit receptacle 115. A check link 116, pivotally connected with a stud 117 on the holder for the unit receptacle and with an arm or bracket 118 depending from the transverse frame member 10, holds the unit receptacle against oscillation. Connected with the supporting member 100 for the wire is an arm 119 which is here shown as comprising two parts rigidly connected one to the other by studs 120 and arranged concentric of the axis of the supporting member. A knife edge pivot 121 arranged between the two parts of the arm at the outer end thereof supports a stirrup 122 with which is connected the upper end of a tape or metallic ribbon 123, the lower end of which is secured to a stirrup 124 having a needle socket 125 to receive a needle point 126 carried by the lever 111, whereby movement of the lever of the unit balance is transmitted to the indicating wire and this wire is moved to a position corresponding to the weight of a unit in the unit receptacle. For convenience in sealing the unit balance the lever 111 is provided at its right hand end with weights 127 and 128 adjustably mounted thereon by means of screws 129 and 130. The weight 127 serves to regulate the initial load as determined by the tension required on the ribbon 123, and the weight 128 serves to regulate the distribution of the weight in the lever above and below the range line, which is the line extending across the axis of the lever 111 and the pivot of the unit receptacle holder 114. The lever 111 is also provided in its outer end with a balancing weight in the form of a screw 131 by means of which the zero balance of the unit balance may be regulated in case the unit balance should get out of balance, which might occur if the unit receptacle becomes badly worn or dirt accumulates thereon.

The supporting member 100 and the parts which are attached to it constitute what may be termed a pendulum unit which serves as a counterbalance for the weight of the unit in the unit receptacle. To this end it is essential that the center of gravity of the pendulum unit be established at the proper distance from its axis and the proper angle from the plumb line through said axis, so as to give a counterbalancing action such as is required to bring the indicating wire 15 into the angular position necessary to effect accurate calculations. For this purpose I have provided the supporting member with weights 171 and 172 which are adjustably mounted thereon by means of screws 173 and 174 and by means of which they may be adjusted along intersecting lines. In so regulating the center of gravity of the pendulum unit to attain the proper positions of the indicator wire 15 the angular position of the arm 119 related to the wire must also be regulated and this is accomplished by means of screws 175, mounted in the supporting member and engaging the studs 120, which are arranged on opposite sides of the axis of the arm 119.

With the mechanism above described the scale will operate automatically for the counting of parts, the only action required on the part of the operator being to place the necessary unit of said parts in the unit receptacle and to place the parts to be counted on the load platform.

In various uses of the scale it may be desired to adjust the indicating wire manually, as, for example, when it is desired to compute the money value of a commodity according to a given price per pound, or where parts of a certain kind are counted at frequent intervals it may be desirable to determine the position of the indicating wire for a given unit of said articles and then set the wire in that position by hand instead of by placing the unit in the unit receptacle. To this end I have mounted in the casing a chart 132 which is so arranged that the lower end of the indicating wire 15 will travel over the same and which is provided, in the present instance, with three series of graduations. The lower series of graduations, 135, is designated by arbitrary numerals which constitute what may be termed index numbers. When it is desired to use an index number in counting articles a unit of these articles is placed in the unit receptacle and the position of the wire on the series of graduations 135 is noted, a record being made of the index number corresponding to the graduation which is intersected by the wire. There should be associated with this index number a second numeral indicating the number of parts in the unit, to enable the operator to determine which column of numerals on the chart is to be used in connection with the graduations thereon, the index number being written, for example, as 25—2, thus indicating that when counting articles of that kind the indicator wire should be set on the graduation numbered 25 and the reading from the chart 14 should be taken in the No. 2 column. In this connection it should be noted that parts, such as are usually counted on mechanisms of this kind, will vary slightly in weight. Obviously any variation in the weight of those articles which constitute the unit will affect the computation and where an index number is being selected it is preferable that a considerable number of parts should be tested and the unit which is used to determine the index number made up of parts of average weight, thereby reducing to a minimum the error in the computation resulting from the variations in the weight of the parts.

The upper portion of the chart 132 is graduated in cents, as shown at 133, and in computing the value of the commodity on the load platform it is only necessary to set the indicator wire on that graduation corresponding to the price per pound, the No. 1 column of numerals on the indicating chart 14 being used in computing the value. The intermediate portion of the chart, 136, is graduated in ounces and fractions thereof and may be utilized to determine the position of the indicating wire where the weight of a unit is known, and also serves to indicate the weight of the unit.

Any suitable means may be provided for manually adjusting the indicator wire but where the unit balance is provided I prefer to provide means for actuating the lever 111 of the unit balance by hand, and for retaining the same in its adjusted positions. To this end I have mounted within the casing a vertically adjustable bar or elongated plate 137, the lower end of which is so arranged that when the bar is moved downwardly it will engage the lever 111 and thus actuate the indicating wire. As here shown, this bar is slotted and slidably mounted on studs 138 carried by the side member 3 of the main frame and is held thereon by means of screws 139. One edge of the bar is provided with a series of rack teeth, as shown at 140, with which meshes a pinion 141 mounted on a short shaft 142 journaled in the frame member 3 and having on its outer end a knob or operating handle 143 by means of which it may be rotated and vertical movement imparted to the actuating bar 137. When the bar 137 is in its uppermost position the end thereof will lie beyond the path of movement of the lever 111 and the operation of the lever will be in no way affected by the presence of that bar. When the indicating wire is to be set by hand the bar is actuated through the medium of the knob 143 to force the lever 111 downwardly until the indicating wire has been moved to its correct position. In order to hold the actuating bar in its elevated position when it is idle and to hold the same against upward movement due to the thrust on the unit balance which tends to raise the lever 111 I have interposed between the plate and the heads of the screws 139 a flat spring 144, which is so curved that it will exert sufficient pressure on the plate to hold the same normally in its adjusted positions.

Connected to the supporting structure 36 for the chart 14 is an indicating arm 145 which carries at its upper end an indicating wire 146 arranged to travel over a fixed chart 147 graduated in pounds and ounces, the arrangement of this indicator arm with relation to the load balance being such that it will indicate on the chart 147 the weight of the load, on the load platform 22, simultaneously with the indication on the chart 14 of the result of the computation.

In order to offset the tare weight of the scoop or other container which may be used in placing the mass of parts on the platform of the load balance, I have provided the transverse or hub portion 17 of the lever 16 with an extension or arm 148 which extends parallel with the main lever 16 in front of the casing and have pivotally mounted on this arm of the lever a scoop weight 149 which may be moved from one side of its axis to the other and will be supported in either position by one or the other of two lugs 150. In Figs. 1 and 4 the scoop weight is shown in the "scoop-off" position. When a standard scoop is placed on the load platform the weight is moved to the opposite side of its axis, in which position it will offset the weight of the scoop. To take care of containers other than standard scoops a tare beam 151 is mounted on the arm or lever 148 and has mounted thereon a tare poise 152 which may be adjusted to offset the weight of the container on the platform.

The vibrations of the load balance and unit balance are controlled respectively by dash pots 154 and 155 which, in the present instance, are substantially identical in construction. Each dash pot comprises a receptacle 156 secured to the base 1 and having mounted therein a piston 157, the movement of which is resisted by liquid within the receptacle. The piston or plunger 157 is connected with a piston rod 158 which extends through an opening in the top wall of the receptacle and is connected at its upper end with the main lever of the balance with which that particular dash pot is associated. Preferably the connection is a ball and socket connection to enable a full universal action of the piston rod, the ball being preferably formed on the end of the rod and seated in a socket 159 carried by the lever. The socket is here shown as adjustably mounted and to this end is secured to a plate 160 which may be secured in adjusted positions on the lever by means of screws 161. The dash pot is provided with a by-pass 162 which is connected with the interior of the receptacle above and below the piston so that the movement of the piston would force the liquid through this by-pass. The rate of flow of liquid through the by-pass is controlled by a plunger or sliding valve 163 having a stem 164 extending through a stuffing box 165 and provided with an actuating knob 166 which lies beyond the wall of the base. By manipulating the knob 166 the plunger 163 may be caused to extend into the by-pass a greater or lesser distance and thus restrict to a greater or lesser extent the passageway through which the liquid must pass.

Owing to the fact that the two balances are gravity controlled it is important that the device as a whole should be set level when sealing the balances and when in use. For this purpose leveling screws 167 are threaded in the base and are independently adjustable so that the scale may be accurately leveled.

The front plate 6 of the casing has a relatively large opening closed by glass through which the indicating members and their associated devices may be viewed but such portions of the mechanism as it is not desired to expose to view may be hidden by means of cover plates 168, 169 and 170, these plates being arranged in the rear of the indicating members but in front of the major portions of the mechanism.

In the construction here shown, the pendulum counterbalance of the load balance is of the reverse type, acting upon the lever in the same direction as the load, whereas the pendulum counterbalance of the unit balance is of the direct acting type which opposes the weight of a unit. In the load balance the dead weight of the indicating member or chart is not a part of the pendulum counterbalance, whereas in the unit balance the dead weight of the indicating member or wire and its supporting arm is a part of the pendulum counterbalance. Further, the main lever of the load balance is of the first order, whereas the main lever of the unit balance is of the second order. It will be understood, however, that these are matters of expediency which may be varied at will.

It will thus be seen that the scale may be utilized for determining the number of articles in a mass of like articles placed on the load platform, by placing a unit of these articles in the unit receptacle. Likewise any desired number of parts within the range of the scale may be counted out by placing a unit of those parts in the unit receptacle and then adding parts to the mass on the load platform until the indicating wire intersects that graduation on the chart which represents the number of parts desired. Further, the same results may be accomplished by setting the indicating wire according to an index number representing the position of the wire for a given unit of a particular kind of article, thus enabling the indicating wire to be set manually instead of by the use of a unit.

Further, the money value of a commodity placed upon the load platform may be determined by manually adjusting the indicating wire to the price per pound indication on chart 133 and taking the reading from the No. 1 column on the indicating chart 14. In this latter connection it will be understood, of course, that if the scale were to be used as a money value computing scale exclusively the unit balance would be omitted and the manner of supporting and adjusting the indicating wire 15 changed accordingly.

Where it is desirable that the computations should be visible on both sides of the machine, as when it is used for computing money values, this can be readily accomplished by duplicating the indicating members and fixed charts at the rear side of the machine, and providing the rear wall of the casing with a sight opening through which the readings may be taken.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a scale, an indicator comprising a movable member, a pivoted support on which said movable member is pivotally mounted, means for actuating said pivoted support, a single guide member extending parallel to the path of movement of said movable member, and parts connected with said movable member and arranged on the opposite sides of said guide member to hold said movable member against vertical displacement as said pivoted support is moved about its axis.

2. In a scale, an indicator comprising a movable member, a pivoted support on which said movable member is pivotally mounted, means for actuating said pivoted support, a single guide member extending parallel to the path of movement of said movable member, and parts connected with said movable member and arranged on the opposite sides of said guide member to hold said movable member in a true vertical position as said pivoted support is moved about its axis.

3. In a scale, an indicator comprising a movable member, a pivoted support on which said movable member is pivotally mounted, means for actuating said pivoted support, a single guide member extending parallel to the path of movement of said movable member, and parts connected with said movable member and arranged on the opposite sides of said guide member to hold said movable member against vertical displacement and to retain the same in a true vertical position as said pivotal support is moved about its axis.

4. In a scale, cooperating indicating members, a supporting structure mounted for movement about a fixed axis, a member pivotally mounted on said supporting structure and carrying one of said indicating members, a single guide member, parts connected with said indicator member and arranged on opposite sides of said guide member to hold said indicating member against vertical displacement when said supporting structure moves about its axis, said pivoted member having its center of gravity established at the axis thereof to prevent frictional contact between said guide and said parts, and means for actuating said supporting structure.

5. In a scale, cooperating indicating members, a supporting structure mounted for movement about a fixed axis, a member pivotally mounted on said supporting structure and carrying one of said indicating members, a single guide member, parts connected with said pivoted member and arranged, respectively, above and below said guide member, means for holding said parts normally out of contact with said guide member, and means for actuating said supporting structure.

6. In a scale, cooperating indicating members, a supporting structure mounted for movement about a fixed axis, a member pivotally mounted on said supporting structure and carrying one of said indicating members, a single guide member, parts connected with said pivoted member and arranged respectively above and below said guide member, and normally out of contact therewith, and adjustable means for establishing the center of gravity of said pivoted member at the axis thereof, and means for actuating said supporting structure.

7. In a scale, cooperating indicating members, a supporting structure mounted for movement about a fixed axis, a lever pivotally mounted on said supporting structure, means for pivotally supporting one of said indicating members on said lever, means for establishing the centers of gravity of said lever and said indicating member at the axes thereof, a single guide member, parts connected with said indicating member and arranged on opposite sides of said guide member to retain said indicating member in a true vertical position and to cause the same to travel in a straight line, and means for actuating said supporting structure.

8. In a calculating scale, cooperating indicating members, a supporting structure mounted for movement about a fixed axis, a member pivotally mounted on said supporting structure, one of said indicating members being pivotally mounted on said pivoted member, a guide, parts connected with said indicating member and said pivoted member to cooperate with said guide to cause said indicating member to move in a straight line when said supporting structure moves about its axis and to retain said indicating member in a true vertical position, and means for actuating said supporting structure.

9. In a calculating scale, cooperating indicating members, a supporting structure mounted for movement about a fixed axis, a member pivotally mounted on said supporting structure, one of said indicating members being pivotally mounted on said pivoted member, an elongated guide, parts connected with said indicating member and arranged on the opposite sides of said guide to hold the indicating member against vertical displacement, other parts connected with said indicating member, spaced from the axis thereof and lying on the opposite sides of said guide to retain said indicating member in a true vertical position, and means for actuating said supporting structure.

10. In a calculating scale, cooperating indicating members, a supporting structure mounted for movement about a fixed axis, a member pivotally mounted on said supporting structure, one of said indicating members being pivotally mounted on said pivoted member, an elongated guide, parts connected with said indicating member and arranged on the opposite sides of said guide to hold the indicating member against vertical displacement, other parts connected with said indicating member spaced from the axis thereof and lying on the opposite sides of said guide to retain said indicating member in a true vertical position, said pivoted member and said indicating member having their centers of gravity established at the respective axes thereof, and means for actuating said supporting structure.

11. In a calculating scale, cooperating indicating members, a supporting structure mounted for movement about a fixed axis, a lever pivotally mounted on said supporting structure, a bracket secured to one of said indicating members and having bearings, a shaft carried by said lever and engaging said bearings to pivotally support said indicating member on said lever, a stud carried by said bracket and spaced from said shaft, a guide extending between said stud and said shaft, an arm connected with said indicating member, extending along said guide and having spaced fingers to embrace said guide, and means for actuating said supporting structure.

12. In a calculating scale, a supporting structure mounted for movement about a fixed axis, a lever pivotally mounted on said supporting structure, a vertically arranged elongated chart, a plate rigidly secured to said chart, a bracket secured to said plate and having bearings, a shaft secured to said lever and engaging said bearings to support said chart on said lever, a stud carried by said bracket and spaced from said lever, a guide wire extending between said stud and said shaft, an arm rigidly secured to said plate, extending along said guide wire and having fingers arranged to embrace said guide wire and hold said chart in a true vertical position, an indicating member to cooperate with said chart, means for actuating said indicating member, and means for actuating said supporting structure.

13. In a calculating scale, cooperating indicating members, a supporting structure mounted for movement about a fixed axis, a member pivotally mounted on said supporting structure, and carrying one of said indicating members, a horizontal guide wire mounted in a normally fixed vertical position, means for maintaining said guide wire in a taut condition, parts connected with said pivoted member and said indicating member and cooperating with said guide wire to hold the latter against vertical displacement and in a true vertical position, and means for actuating said supporting structure.

14. In a calculating scale, a frame, cooperating indicating members, a supporting structure mounted on said frame for movement about a fixed axis, a member pivotally mounted on said supporting structure and carrying one of said indicating members, collars mounted on said frame in spaced relation one to the other and each having a circumferential V-shaped groove, a wire having at its opposite ends hooks having tapered edges to engage the grooves in said collars and hold said wire against vertical displacement, parts connected with said pivoted member and said indicating member to engage said wire and hold said indicating member against vertical displacement and in a true vertical position, and means for actuating said supporting structure.

15. In a calculating scale, a frame, cooperating indicating members, a supporting structure mounted on said frame for movement about a fixed axis, a member pivotally mounted on said supporting structure and carrying one of said indicating members, a guide rigidly connected at one end with said frame and having a head at its other end, a tubular casing secured to said frame in which said head is slidably mounted, a spring confined between said head and the inner wall of said casing to hold said wire under tension, parts connected with said indicating member to engage said wire and control the position of said indicating member, and means for actuating said supporting structure.

16. In a calculating scale, an indicating member, load controlled means for actuating said indicating member, a second indicating member to cooperate with the first mentioned indicating member, unit controlled means for actuating said second indicating member, manually actuated means arranged to impart movement to said unit controlled means and actuate said second indicating member independently of the unit, and a chart arranged adjacent to the path of movement of said second indicating member to indicate the position thereof.

17. In a calculating scale, an indicating member, load controlled means for actuating said indicating member, a second indicating member to cooperate with the first mentioned indicating member, unit controlled means for actuating said second indicating member, manually actuated means arranged to impart movement to said unit controlled means and actuate said second indicating member independently of the unit, and a chart arranged adjacent to the path of movement of said second indicating member and having a plurality of series of graduations, each series differing from the other series.

18. In a calculating scale, an indicating member, load controlled means for actuating said indicating member, a second indicating member to cooperate with the first mentioned indicating member, unit controlled means for actuating said second indicating member, manually actuated means arranged to impart movement to said unit controlled means and actuate said second indicating member independently of the unit, a chart arranged adjacent to the path of movement of said second indicating member and having a series of graduations designated by index numbers and having a second series of graduations representing money values.

19. In a calculating scale, an indicating member, load controlled means for actuating said indicating member, a second indicating member to cooperate with the first mentioned indicating member, a unit receptacle, a lever supporting said unit receptacle and operatively connected with said second indicating member, and a manually operated device arranged to engage said lever and actuate said second indicating member.

20. In a calculating scale, an indicating member, load controlled means for actuating said indicating member, a second indicating member to cooperate with the first mentioned indicating member, a unit receptacle, a lever supporting said unit receptacle and operatively connected with said second indicating member, an actuating member arranged to engage said lever and impart movement to said second indicating member, manually operated means to impart movement to said actuating member, and means to retain said actuating member in adjusted positions.

21. In a calculating scale, an indicating member, load controlled means for actuating said indicating member, a second indicating member to cooperate with the first mentioned indicating member, a unit receptacle, a lever supporting said unit receptacle and operatively connected with said second indicating member, an actuating member mounted for movement into engagement with said lever to impart movement to said second indicating member and having rack teeth in one edge thereof, a pinion meshing with said teeth, an operating handle connected with said pinion, and means for retaining said actuating member in adjusted positions.

22. In a calculating scale, an indicating member, load controlled means for actuating said indicating member, a second indicating member to cooperate with the first mentioned indicating member, a unit receptacle, a lever supporting said unit receptacle and operatively connected with said second indicating member, a plurality of studs mounted in fixed positions above said lever, a plate mounted on said studs and having vertical slots, screws extending through said slots into said studs, said plate having rack teeth in one edge thereof, a pinion meshing with said rack teeth, an operating handle connected with said pinion, and a flat spring carried by said screws and held thereby in frictional contact with said plate.

23. In a calculating scale, cooperating indicating members, a supporting structure pivotally mounted on a fixed axis and comprising an upwardly extending arm and laterally and downwardly extending arms, a lever pivotally mounted on the upwardly extending arm, means for supporting one of said indicating members on said lever, means for controlling the position of said indicating member when it moves with said lever, rods mounted for adjustment about the axis of said supporting structure and extending lengthwise of the respective last mentioned arms, weights mounted on said rods for adjustment lengthwise thereof, means carried by the respective arms and engaging said rods to adjust said weights about the axis of said supporting structure, and means for actuating said supporting structure.

24. In a calculating scale, an indicating member, unit controlled means for actuating said indicating member, a second indicating member, a lever operatively connected with said second indicating member, a load receptacle pivotally supported on said lever, a post rigidly secured to and depending from said receptacle, a fixed post arranged substantially parallel with but spaced from the first mentioned post, a link having a knife edge pivotal connection with each of said posts, and means for adjusting said fixed post with relation to the first mentioned post.

25. In a calculating scale, an indicating member, load controlled means for actuating said indicating member, a second indicating member to cooperate with the first mentioned indicating member, means for positioning said second indicating member according to a unit of computation, and a chart arranged adjacent to the path of movement of said second indicating member to indicate the position thereof.

In testimony whereof, I affix my signature hereto.

WILLIAM R. MITTENDORF.